(12) United States Patent
Hardi

(10) Patent No.: US 12,365,485 B2
(45) Date of Patent: Jul. 22, 2025

(54) AIRCRAFT SUB-ASSEMBLY MANUFACTURING SYSTEM AND METHOD

(71) Applicant: Airbus Operations Limited, Bristol (GB)

(72) Inventor: Robin Hardi, Bristol (GB)

(73) Assignee: Airbus Operations Limited, Bristol (GB)

( * ) Notice: Subject to any disclaimer, the term of this patent is extended or adjusted under 35 U.S.C. 154(b) by 0 days.

(21) Appl. No.: 18/413,838

(22) Filed: Jan. 16, 2024

(65) Prior Publication Data

US 2024/0239516 A1 Jul. 18, 2024

(30) Foreign Application Priority Data

Jan. 17, 2023 (GB) ...................................... 2300676

(51) Int. Cl.
*B64F 5/10* (2017.01)
*B64F 5/50* (2017.01)
*B66B 9/00* (2006.01)

(52) U.S. Cl.
CPC .................. *B64F 5/10* (2017.01); *B64F 5/50* (2017.01); *B66B 9/00* (2013.01); *B23P 2700/01* (2013.01)

(58) Field of Classification Search
CPC ...... B62D 65/024; B62D 65/12; B62D 65/14; B62D 65/18; B62D 65/022; B62D 65/02; G05D 1/646; G05D 2107/70; G05D 2109/10; B23P 2700/01; B23P 2700/00; B64F 5/10; B66B 9/00
See application file for complete search history.

(56) References Cited

U.S. PATENT DOCUMENTS

| | | | | |
|---|---|---|---|---|
| 2014/0337777 | A1* | 11/2014 | Senesac | B64F 5/10 715/771 |
| 2016/0151868 | A1 | 6/2016 | Attucci | |
| 2021/0206513 | A1* | 7/2021 | Adamson | B64C 25/16 |
| 2021/0380279 | A1* | 12/2021 | Prendergast | B64F 5/10 |
| 2022/0234664 | A1 | 7/2022 | Santillo | |
| 2022/0234761 | A1* | 7/2022 | Bonnefoy | B64F 5/10 |

FOREIGN PATENT DOCUMENTS

| | | |
|---|---|---|
| CN | 101538945 A | 9/2009 |
| CN | 205311924 U | 6/2016 |
| CN | 206105314 U | 4/2017 |
| CN | 113400002 A | 9/2021 |

(Continued)

OTHER PUBLICATIONS

Extended European Search Report for EP Application No. 23219141.1, dated Jun. 10, 2024, 13 pages.

(Continued)

*Primary Examiner* — Lawrence Averick
(74) *Attorney, Agent, or Firm* — KDW Firm PLLC

(57) ABSTRACT

An aircraft sub-assembly manufacturing system is arranged over multiple floors of a manufacturing facility. A production line of workstations is provided at locations at both a first floor and a second floor of the facility, each of the workstations being arranged for providing manufacturing steps for the aircraft sub-assembly. Elevator apparatus is arranged to transport the assembled aircraft sub-assembly between the first floor and the second floor of the facility.

12 Claims, 4 Drawing Sheets

(56) References Cited

FOREIGN PATENT DOCUMENTS

| EP | 4001130 A1 | 5/2022 |
|----|------------|--------|
| EP | 4002034 A1 | 5/2022 |
| WO | 2017021722 A1 | 2/2017 |

OTHER PUBLICATIONS

British Search Report for Application No. 2300676 dated Jun. 30, 2023.
Anonymous, "AGVs move Porsche's Taycan EVs through multi-level plant, "Talking Industry Podcast, http://drivesncontrols.com/news/fullystory.php/aid/6435/AGVs_move_Porsche_9s2s_Taycan_EVs_through_multi-level_plant.html, Jul. 20, 2020.
Anonymous, "Airbus inaugurates new A320 structure assembly line in Hamburg," Newsroom, http://www.airbus.com/en/newsroom/press-releases/2019-10-airbus-inaugurates-new-a320-structure-assembly-line-in-hamburg, Oct. 1, 2019.

* cited by examiner

AIRCRAFT SUB-ASSEMBLY MANUFACTURING SYSTEM AND METHOD

TECHNICAL FIELD

The disclosure herein concerns aircraft sub-assembly manufacturing systems and methods. More particularly, but not exclusively, the disclosure herein concerns aircraft wing manufacturing systems and methods.

BACKGROUND

Manufacture of an aircraft sub-assembly such as a wing typically takes place at a large manufacturing facility.

A mass production line may be located on the floor of the manufacturing facility, the production line having a number of workstations arranged in a sequential manner. Each workstation of the production line is typically provided with tooling and equipment in order to fulfil a specific function, such as welding, painting, curing, and other manufacturing steps. Components of the aircraft sub-assembly are required to move between these workstations in the correct sequence in order to be assembled and tested, and for ancillary components to be fitted.

The aircraft sub-assembly may be assembled from a number of components. These are typically assembled using a jig which supports the components in their correct positions until they are combined or otherwise built-up to the extent that the aircraft sub-assembly is able to support itself, at which point the jig is removed.

A problem with this arrangement is that the size and weight of the components, the aircraft sub-assembly and the jig, and the number of discrete workstations required mean that a large amount of floor space is taken up by the production line. While availability of space is not necessarily a problem with new-build facilities, there may be a need for repurposing buildings or factories where efficient use of existing floor space becomes a limiting factor in relation to production rates.

The disclosure herein seeks to mitigate one or more of the above-mentioned problems. Alternatively or additionally, the disclosure herein seeks to provide an improved aircraft manufacturing system and method.

SUMMARY

The disclosure herein provides, according to a first aspect, a method for manufacturing an aircraft sub-assembly. The method comprises mounting at least one component of an aircraft sub-assembly on a mobile jig. The mobile jig is arranged to move within a first floor of a facility. The method also comprises moving the mobile jig (with the associated component(s) of the sub-assembly) between a plurality of first floor workstations. Manufacturing steps are performed on the at least one component at the plurality of first floor workstations to assemble the aircraft sub-assembly. There is a step of removing the aircraft sub-assembly from the mobile jig and then moving the aircraft sub-assembly (i.e. once removed from the jig) to a second floor of the facility. The second floor is vertically separated from the first floor, for example being at a higher level. There is then a step of moving the aircraft sub-assembly on the second floor between a plurality of second floor workstations, at which further manufacturing steps are performed on the aircraft sub-assembly.

In this way, the amount of floor space (in terms of the facility footprint) is reduced, by arranging those workstations which do not require a jig to be located at a second floor of the facility. This also facilitates more efficient use of the jig.

It will be appreciated that the term "floor", when used in the context of the "first floor", "second floor" or the like, refers to a level within the manufacturing facility, which may for example be a factory building.

Preferably the method further comprises, after performing manufacturing steps on the aircraft sub-assembly at the plurality of second floor workstations, returning the aircraft sub-assembly to the first floor of the facility.

In this way the completed aircraft sub-assembly may be removed from the facility via the same delivery area and door as is used for incoming components.

The jig may weigh at least 20 tonnes. The aircraft sub-assembly may have a mass of at least 3 tonnes when it is on the second floor of the facility. In such a case, where the jig has a significant mass compared to the associated sub-assembly on the jig, possibly having a mass much greater than the sub-assembly, it may advantageously be the case that the second floor of the facility can be designed with lower load-bearing requirements as compared to those of the first floor.

The first floor may be a ground floor of the facility, and the second floor is preferably above the first floor of the facility. The second floor will have sufficient structure to support not only the second floor workstations, but also the weight of the sub-assemblies and other equipment and components that would be required. The second floor may have a floor (i.e. base) that has a weight-bearing capacity of a least 3 tonnes per square meter. It may be that the second floor has a floor that has a weight-bearing capacity of less than 10 tonnes per square meter.

The area of the floor of the second floor may be at least 25 square meters and may be greater than 50 square meters. It may be that the second floor is built off the floor of the first floor. The second floor may be a mezzanine floor. There may be structural members that extend vertically from the base of the first floor and which support the base of the second floor. The base of the first floor may therefore need to be strong enough to support the weight of not only the first floor workstations, the sub-assemblies and other equipment and components that would be required on the first floor, but also the entire weight of the second floor and any structural members. The first floor may have a floor that has a weight-bearing capacity of at least 10 tonnes per square meter.

The first floor may have a floor with a weight-bearing capacity, which is at least 50% greater than, and possibly more than twice than, the weight bearing capacity of the second floor. Thus, as mentioned above, it may be that the second floor of the facility has load-bearing requirements that are lower than those of the first floor.

It will be appreciated that when the aircraft sub-assembly is removed from the jig, it is more manoeuvrable and less heavy than when attached to the jig, and this facilitates it being easily elevated to the second (higher) floor of the facility by suitable approaches such as an elevator apparatus. However, there may be stages in manufacture during which the aircraft sub-assembly is not sufficiently assembled to be moved or handled without the assistance of a suitable jig.

The second floor may have base that is vertically separated from a base of the first floor by a distance that is greater than 8 meters. The facility may have a floor to ceiling height that is greater than 20 meters. The facility may have a foot-print of at least 4,500 square meters. The elevator may be required to lift a load of at least 10 tonnes. Given that the jig need not be included in the payload to be lifted by the elevator, the maximum load capacity of the elevator may be less than 30 tonnes and possibly less than 25 tonnes, and optionally 20 tonnes or less.

Each workstation may have a footprint of at least 250 square meters which does not overlap with the footprint of any adjacent workstation.

In a further embodiment, the aircraft sub-assembly may be moved to a third floor of the facility, the third floor being vertically separated from the first floor and the second floor. The aircraft sub-assembly is preferably moved on the third floor between a plurality of third floor workstations; and manufacturing steps are preferably performed on the aircraft sub-assembly at the plurality of third floor workstations.

Such an arrangement provides yet further potential space-saving within the facility. Furthermore, it provides more flexibility within the production line, allowing sub-assemblies to be removed and re-introduced at various stages of the manufacturing process.

Mounting the at least one component of the aircraft sub-assembly on a mobile jig preferably comprises mounting a plurality of components on the mobile jig, the plurality of components being combined on the mobile jig to form the aircraft sub-assembly. It may be that there are at least two components (possibly more than two) that have a mass of more than 300 Kg and/or have a longest dimension of greater than 15 m, for example in the case where the aircraft sub-assembly is a wing.

It will be appreciated that the mobile jig provides a movable frame which holds the components in place until they are 'built-up' to form the sub-assembly.

Preferably the plurality of first floor workstations comprise a linear production line having a first workstation and a last workstation, and wherein the step of moving the mobile jig comprises moving the mobile jig along the production line from the first workstation to the last workstation, and after removing the aircraft sub-assembly from the mobile jig at the last workstation, returning the mobile jig to the first workstation.

In this way the mobile jig may describe a loop around the plurality of first floor workstations, which allows efficient use of the mobile jig on the first floor.

It will be appreciated that typically the mobile jig is a relatively heavy and valuable piece of apparatus, and cannot be easily elevated to the second or third floor of the facility.

The first floor workstations may include at least one workstation (and preferably two or more workstations) at which the aircraft sub-assembly has a component—or set of components—added to it (for example, a rib, wing cover, or the like), for example adding mass to the sub-assembly of at least 300 Kg at the work-station. The second floor workstations may include at least one workstation (and preferably two or more workstations) at which the aircraft sub-assembly is tested, and/or has a manufacturing process performed on it which does not change the mass of the sub-assembly significantly (e.g. a change in mass, if any, of less than 10%, possibly less than 5%).

The production line may be a flow-line production line. The production line may be a pulse-line production line.

It will be appreciated that with both flow-line and pulse-line production methods, production efficiency is obtained when an appropriate number of workstations are provided. The above arrangement allows increased flexibility in terms of the number of workstations, and their spatial arrangement within the facility.

Preferably the aircraft sub-assembly is an aircraft wing.

Alternatively, the aircraft sub-assembly may be a horizontal stabilizer or other control surface of the aircraft.

According to a second aspect of the disclosure herein, there is provided a multi-level aircraft manufacturing system. The system comprises a manufacturing facility (e.g. in the form of a factory building) in which there is provided a mobile jig, multiple workstations located on at least two different vertically separated floors of the facility, and an elevator for transporting an aircraft sub-assembly between floors of the facility. The jig is arranged for supporting at least one component of the aircraft sub-assembly during manufacture. The workstations include a plurality of first floor workstations located at a first floor of the facility and a plurality of second floor workstations located at a (vertically separated) second floor of the facility. The first floor workstations are arranged for receiving the mobile jig and for assembling components to form the aircraft sub-assembly on the jig. During performance of the method, it may be that the jig provides support to at least some parts of the aircraft sub-assembly which would, if the jig were removed, be at a risk of deformation or damage. Such parts, for example wing covers, are not designed to simply rest on a factory floor or be hoisted, other than by special equipment, such as a suitable mobile jig. The second floor workstations are arranged for receiving the assembled aircraft sub-assembly (e.g. without the jig) and for performing manufacturing steps thereon. The elevator apparatus is arranged for vertically transporting the assembled aircraft sub-assembly between the first floor and the second floor. The aircraft sub-assembly may therefore be manufactured on two levels of the facility.

In this way the elevator apparatus allows the production line to extend over two (or more) floors of the facility, thereby improving the use of available space within the facility. Whereas previously the production line for one aircraft sub-assembly may have taken up an entire manufacturing facility, by extending the production line over two or more floors, it is possible to provide two production lines within the same facility. For example, left and right wings of an aircraft may be manufactured at side-by-side production lines, both of which extend over two or more floors of the (single) facility.

The second floor is preferably above the first floor of the facility.

Preferably the system further comprises a plurality of third floor workstations at a third floor of the facility, the third floor being vertically separated from the first floor and the second floor, wherein the elevator apparatus is further arranged for vertically transporting the assembled aircraft sub-assembly between the first floor, second floor and third floor of the facility, and wherein the plurality of third floor workstations is arranged for receiving the assembled aircraft sub-assembly and for performing manufacturing steps thereon.

Preferably the elevator apparatus comprises a first elevator arranged to transport the aircraft sub-assembly from the first floor up to the second floor (and optionally to the third floor) and a second elevator arranged to transport the aircraft sub-assembly down from the second floor (and optionally the third floor) to the first floor.

Alternatively, further elevators may be arranged to transport the aircraft sub-assembly between the second floor and the third floor.

The mobile jig is preferably arranged to support the at least one component until the sub-assembly is assembled.

Preferably the plurality of first floor workstations comprise a production line having a first workstation and a last workstation, and the jig is arranged to move along the production line from the first workstation to the last workstation during assembly of the sub-assembly.

The aircraft sub-assembly is preferably removed from the mobile jig at the last workstation.

Preferably the production line is one of a flow-line and a pulse-line production line.

As mentioned above in relation to the first aspect of the disclosure herein, the aircraft sub-assembly is preferably an aircraft wing.

The disclosure herein also provides a method of making an aircraft including assembling a sub-assembly of the aircraft to form at least part of the completely assembled aircraft, the sub-assembly being one made with the use of an embodiment of the according to any aspect of the disclosure herein as described or claimed herein.

The aircraft may be a passenger aircraft. The passenger aircraft preferably comprises a passenger cabin comprising a plurality of rows and columns of seat units for accommodating a multiplicity of passengers. The aircraft may have a capacity of at least 20, more preferably at least 50 passengers, and more preferably more than 50 passengers. The aircraft may be a commercial aircraft, for example a commercial passenger aircraft, for example a single aisle or twin aisle aircraft. The aircraft need not be configured for carrying passengers, but could for example be an aircraft of an equivalent size configured for cargo and/or used on a non-commercial basis. The aircraft may have a maximum take-off weight (MTOW) of at least 20 tonnes, optionally at least 40 tonnes, and possibly 50 tonnes or more. The aircraft may have an operating empty weight of at least 20 tonnes, optionally at least 30 tonnes, and possibly about 40 tonnes or more.

There is also provided a method of converting an existing aircraft manufacturing facility into the system according to any aspect of the disclosure herein as described or claimed herein. Such a facility may have a height providing unutilized or poorly utilized space which can be put to better use by an embodiment of the disclosure herein. Such a method may be considered as retrofitting an embodiment of the disclosure herein into an existing facility. The method may comprise providing and/or installing the plurality of second floor workstations. The method may comprise providing and/or installing the second floor of the facility. The method may comprise providing and/or installing the elevator apparatus. The existing aircraft manufacturing facility may before the method is performed, already comprise the first floor of the facility to be created, typically the ground level floor. The existing aircraft manufacturing facility may before the method is performed, already comprise one or more mobile jigs for supporting an aircraft sub-assembly during manufacture. Different jigs may be required if the facility is being converted for use to manufacture different aircraft sub-assemblies, however. The existing aircraft manufacturing facility may before the method is performed, already comprise the plurality of first floor workstations. The workstations may need to be moved in order to make better use of the space available in the facility. Workstations previously on the first floor of the existing facility may be reutilized as second floor workstations in the converted system according to the disclosure herein.

It will of course be appreciated that features described in relation to one aspect of the disclosure herein may be incorporated into other aspects of the disclosure herein. For example, the method of the disclosure herein may incorporate any of the features described with reference to the apparatus of the disclosure herein and vice versa.

BRIEF DESCRIPTION OF THE DRAWINGS

Embodiments of the disclosure herein will now be described by way of example only with reference to the accompanying schematic drawings in which.

DETAILED DESCRIPTION

Figure 1:
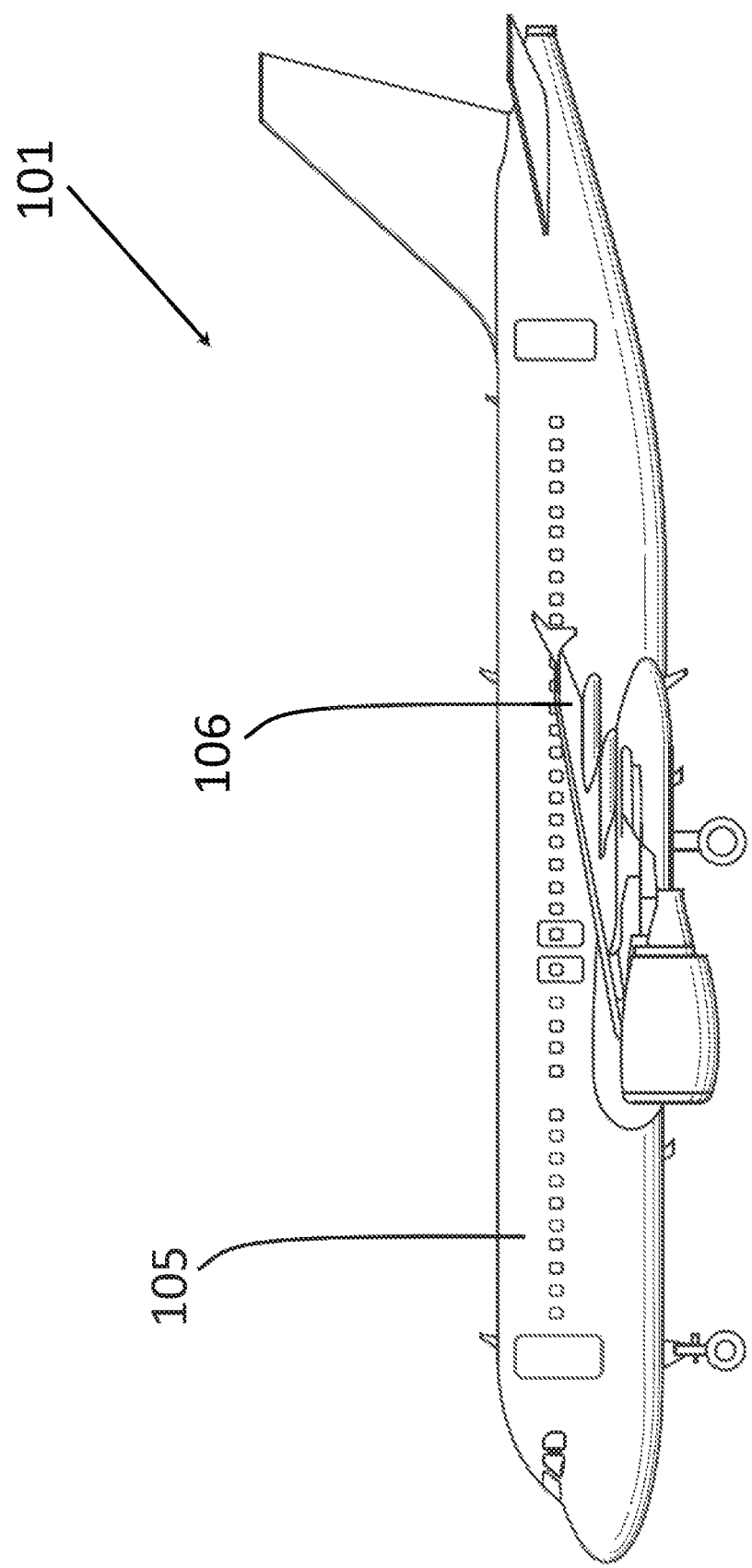
FIG. 1 shows an aircraft comprising sub-assemblies.

FIG. 1 shows an aircraft 101 comprising a pair of wings 106 and a fuselage 105. Typically, the wings 106 are manufactured as sub-assemblies and then fitted to the fuselage 105 during final aircraft assembly.

Figure 2:
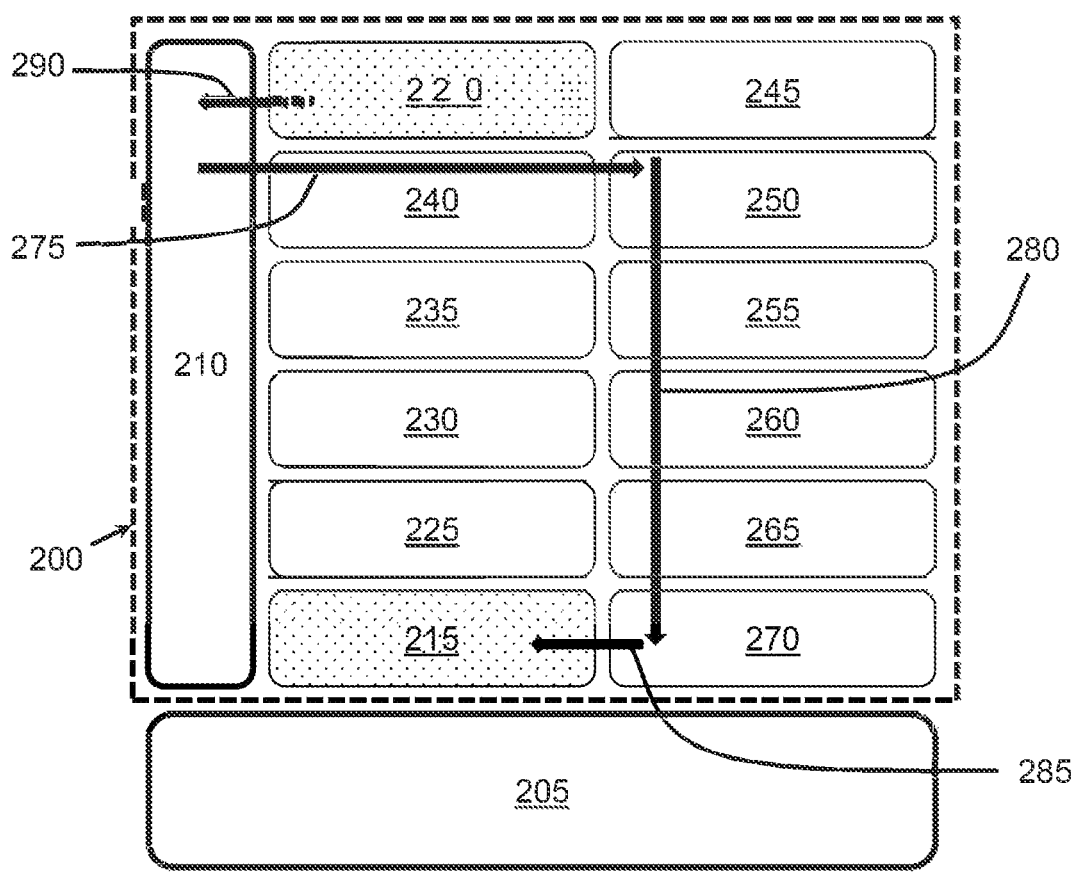
FIG. 2 shows a first floor of an aircraft sub-assembly production line according to a first embodiment of the disclosure herein.

Referring now also to FIG. 2, a first floor 200 of an aircraft sub-assembly manufacturing facility is shown. The manufacturing facility contains a production line which extends over two floors. A delivery area 205 outside the facility is provided for vehicles to deliver and collect components and sub-assemblies.

Within the facility, a delivery aisle 210 is provided on the first floor for facilitating movement of components, sub-assemblies and other elements within the first floor 200 of the facility.

A first portion of the production line is located on the first floor 200 and comprises two elevators and a number of workstations as follows. A first elevator 215 and a second elevator 220 are provided for transferring sub-assemblies between floors of the manufacturing facility, in a manner to be further described below.

Workstations 225 and 245 are spare or so-called 'hospital' workstations, which may be used for remedial work on a sub-assembly at the end of the manufacturing process, should the need arise.

Workstations 230, 235 and 240 are preparatory workstations, where components may be held or prepared prior to being installed at a sub-assembly.

Workstations 245, 250, 255, 260, 265 and 270 are jig workstations, each arranged to receive a main assembly jig within which a sub-assembly is carried. The main assembly jig is a mobile jig or frame, which is arranged to support one or more components of a sub-assembly in their correct positions until they are combined or otherwise built-up so that the aircraft sub-assembly is able to support itself, at which point the jig is removed.

As previously mentioned, workstation 245 is a spare. Workstations 250, 255, 260, 265 and 270 may be organised with suitable robots, tooling and equipment in order to fulfil a particular function with respect to the sub-assembly within the jig. For example, jig workstation 250, which is the first workstation of the production line, may be a spar and rib assembly workstation which is arranged to receive, within the jig, these components of the sub-assembly, and to weld or bolt these components together. The spar may be up to 17 m in length and may have a mass of up to 600 kgs. Each rib may be up to 3.5 m long and have a mass of up to 300 kgs. The jig is arranged to be moved between workstations on wheels, rails or an overhead gantry system (not shown).

Jig workstations 255, 260, and 265 may then each be arranged for introducing further components to be fitted to the sub-assembly while within the jig, or to perform other manufacturing steps on the sub-assembly while within the jig. For example, workstation 255 may be an upper cover assembly workstation, where an upper cover and other components are added to the sub-assembly. Similarly, workstation 260 may be a lower cover assembly workstation, where a lower cover and other components are added to the sub-assembly. The upper and lower covers may also be up to 17 m in length and may each have a mass of up to 2 tonnes. Workstation 265 may be an external fittings assembly, where yet further fittings are attached to the sub-assembly.

Finally, workstation 270 is arranged for removing the sub-assembly from the jig, once the sub-assembly is in a state of manufacture that allows it to be so removed. The sub-assembly may be lowered on to a trolley (not shown) so as to facilitate further movement within the facility.

The jig, which is now free of a sub-assembly, is transported from the workstation 270 back to spare workstation 245 via an overhead gantry system (not shown), which is arranged above the workstations 250, 255, 260 and 265. From here it is ready to be moved to jig workstation 250 to receive components of a subsequent sub-assembly, or to receive a sub-assembly which requires remedial attention (see below). In this way a production line loop exists for the jig at the first floor 200. It will be appreciated that a number of jigs may be utilized in the production line, each jig processing around the loop.

Each of the preparatory workstations 230, 235 and 240 may be arranged so that they coordinate with the jig workstations described above. For example, workstation 240 may be arranged as a spar preparation workstation, where preparatory work is performed on a spar before it is combined with other components of a sub-assembly at jig workstation 250, conveniently adjacent the preparatory workstation 240.

Figure 3:
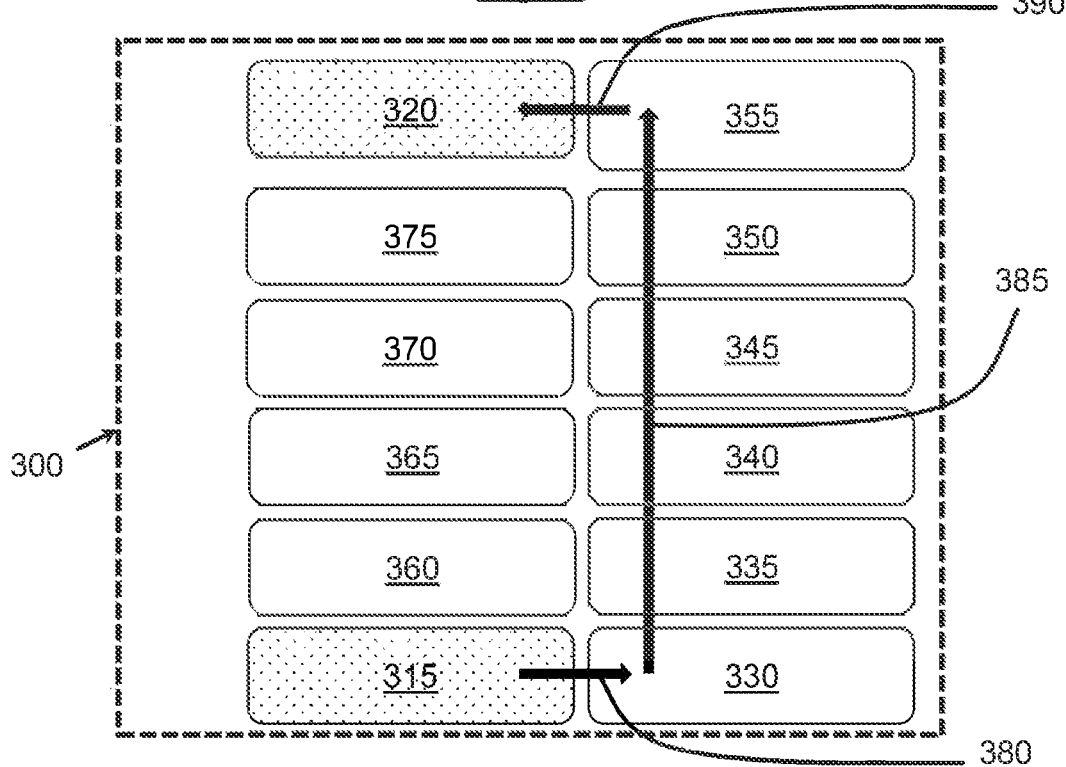
FIG. 3 shows a second floor of an aircraft sub-assembly production line according to the first embodiment of the disclosure herein.

Referring now also to FIG. 3, a second floor 300 of an aircraft sub-assembly manufacturing facility is shown, which is above the first floor 200, and which comprises a second portion of the production line. The second portion of the production line comprises parking workstations 330 and 355, manufacturing workstations 335, 340, 345, and 350, and store workstations 360, 365, 370 and 375.

The second floor 300 also has first and second elevator platforms 315 and 325 respectively, which are above the first elevator 215 and the second elevator 220 of the first floor and are arranged for coordinating with their respective elevators 215 and 220. In this way a sub-assembly resting on a trolley may be received at the first elevator platform 315 from the first floor 200 via the first elevator 215. Similarly, a sub-assembly resting on a trolley may be transported back from the second elevator platform 320 to the first floor 200 via the second elevator 220.

The parking workstation 330 is for holding a sub-assembly after it has been received from the first elevator platform 315. Similarly, parking workstation 355 is for holding a sub-assembly before it is sent to the second elevator platform 320 for return to the first floor 200.

The manufacturing workstations 335, 340, 345, and 350 are each be arranged for performing further manufacturing steps on the sub-assembly, including (but not limited to) fitting ancillary components, pressurizing and testing hydraulic systems, and fitting and testing electrical or electronic systems. The sub-assembly may be moved between the workstations of the second floor via the trolley (not shown).

The store workstations 360, 365, 370 and 375 are provided to store ancillary components, tools and other items which are required to be used at the workstations 335, 340, 345, and 350. For example, workstation 360 may be arranged to store components of the flap system of the sub-assembly, which are then fitted to the sub-assembly at workstation 335, which conveniently adjacent workstation 360.

Figure 4:
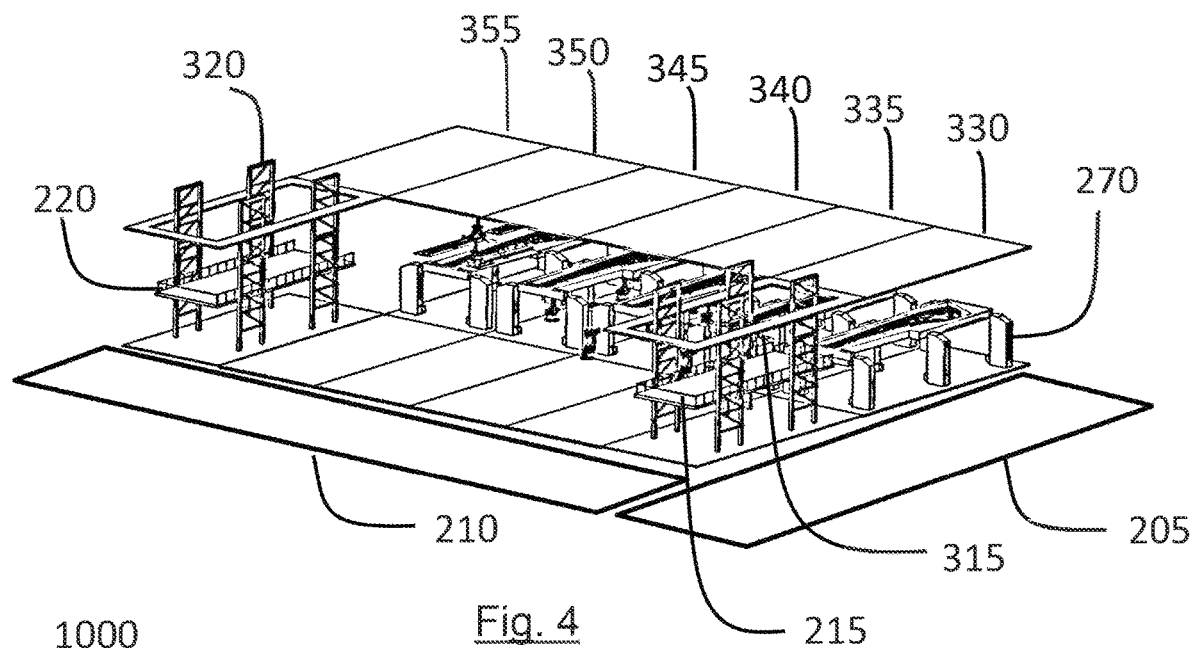
FIG. 4 shows a perspective view of the aircraft sub-assembly production line shown in FIG. 2 and FIG. 3.

Referring now also to FIG. 4, a perspective view of the facility is shown, illustrating the relative positions of the workstations, elevators and platforms of FIGS. 2 and 3. For the sake of clarity, not all of the first floor workstations are labelled. Similarly, the store workstations 360, 365, 370 and 375 of the second floor are omitted for clarity.

Figure 5:
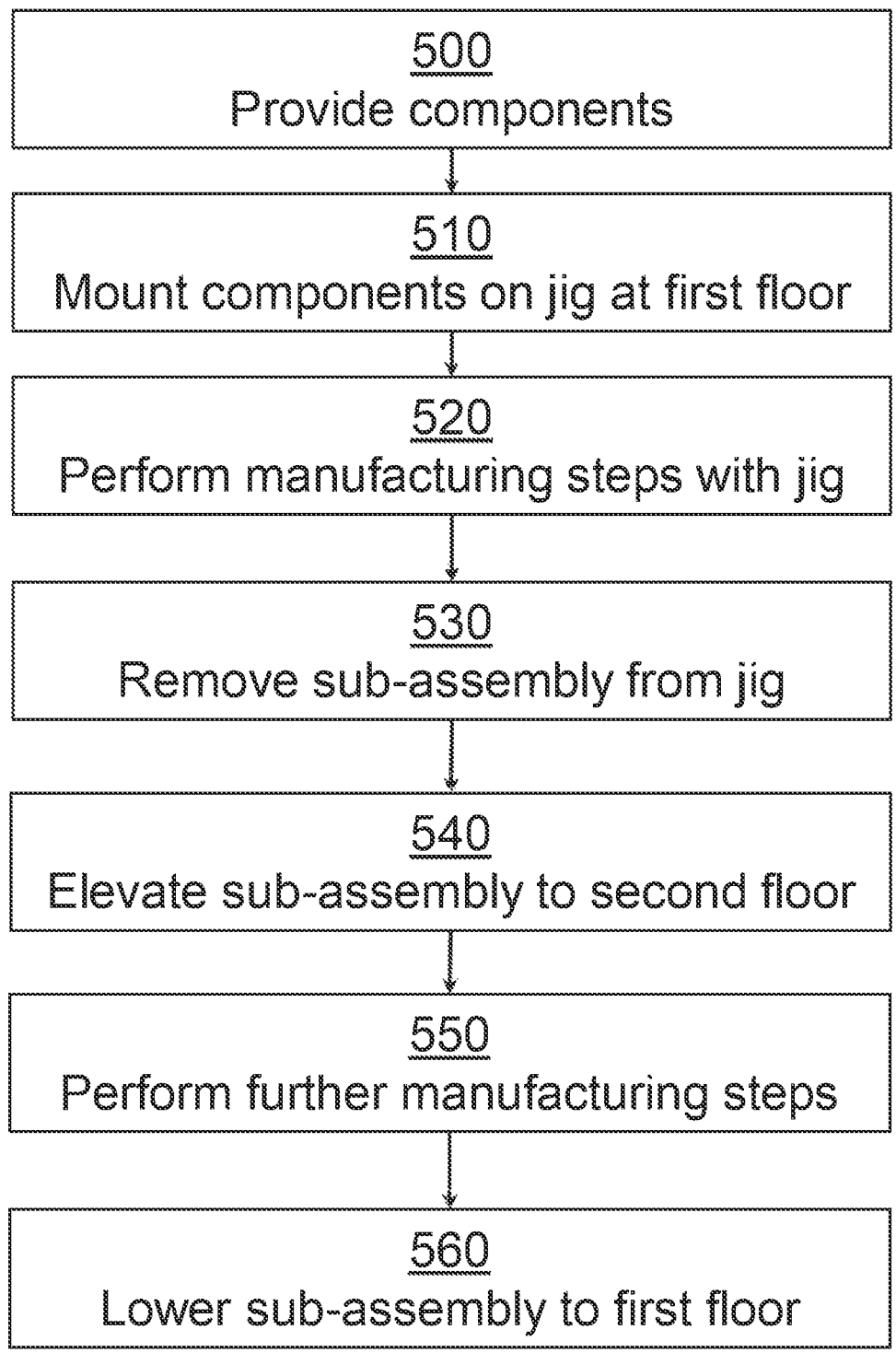
FIG. 5 is a flow diagram illustrating a method of manufacturing an aircraft sub-assembly in accordance with a second embodiment of the disclosure herein.

In operation, and referring now also to FIG. 5, an aircraft sub-assembly is manufactured at the facility according to the following steps. As depicted at box 500, at least one component of the sub-assembly is provided. As mentioned above, this could be a spar, or other significant single component of the sub-assembly. It may be brought to the facility by road, being unloaded at the delivery area 205 and transported within the facility to the preparatory workstation 240 via the delivery aisle 210 as shown by arrow 275 of FIG. 2, where it may undergo preparation steps. Then, as depicted at box 510, the component(s) is/are mounted on a jig at the jig workstation 250. Manufacturing steps are then performed on the sub-assembly at jig workstations 250 to 265 inclusive, as shown by the arrow 280 and as depicted by box 520. In this way the sub-assembly begins its manufacturing journey around the facility.

Then, at workstation 270, and as depicted by box 530, the assembled sub-assembly is removed from the jig, and may be lowered on to a trolley (not shown), before being moved to the first elevator 215 as shown by arrow 285. It is then elevated to the second floor by the first elevator 215, arriving at the first elevator platform 315, as depicted by box 540.

The sub-assembly is then moved to the parking workstation 330 (see arrow 380 of FIG. 3), before then progressing through the manufacturing workstations 335, 340, 345, and 350 of the first floor (as depicted by box 550 and arrow 385), arriving at the parking workstation 355.

Finally the sub-assembly, which has now been completed, is moved to the second elevator platform 320, as shown by arrow 390, whereupon it is returned to the first floor via the second elevator 220, as depicted in box 560. It may then be transported out of the facility via the delivery aisle 210, as shown by arrow 290.

As previously mentioned, workstations 225 and 245 are spare or 'hospital' workstations. In the event that a sub-assembly which has completed the manufacturing steps at 270, and is therefore removed from the jig, is not able to be transported via the first elevator 220 to the second floor 300 for any reason (for example a minor defect with the sub-assembly, a problem with the first elevator 215, or a blockage in the production line due to any other issue at the second floor 300), the sub-assembly may instead be placed at workstation 225. If there is a minor defect with the sub-assembly, it may be worked on at workstation 225 and following successful defect rectification, it may then be placed on the elevator 220, thereby being reintroduced into the production line.

Similarly, a sub-assembly which has descended via the second elevator 220 is not able to be released from the production line to the delivery aisle 210, it may be placed at the workstation 245. From here, depending on the nature of the issue, it may undertake a further excursion around the production line (by being placed within a jig and reintroduced into the production line at workstation 250), or it may be worked on at workstation 245.

Figure 6:
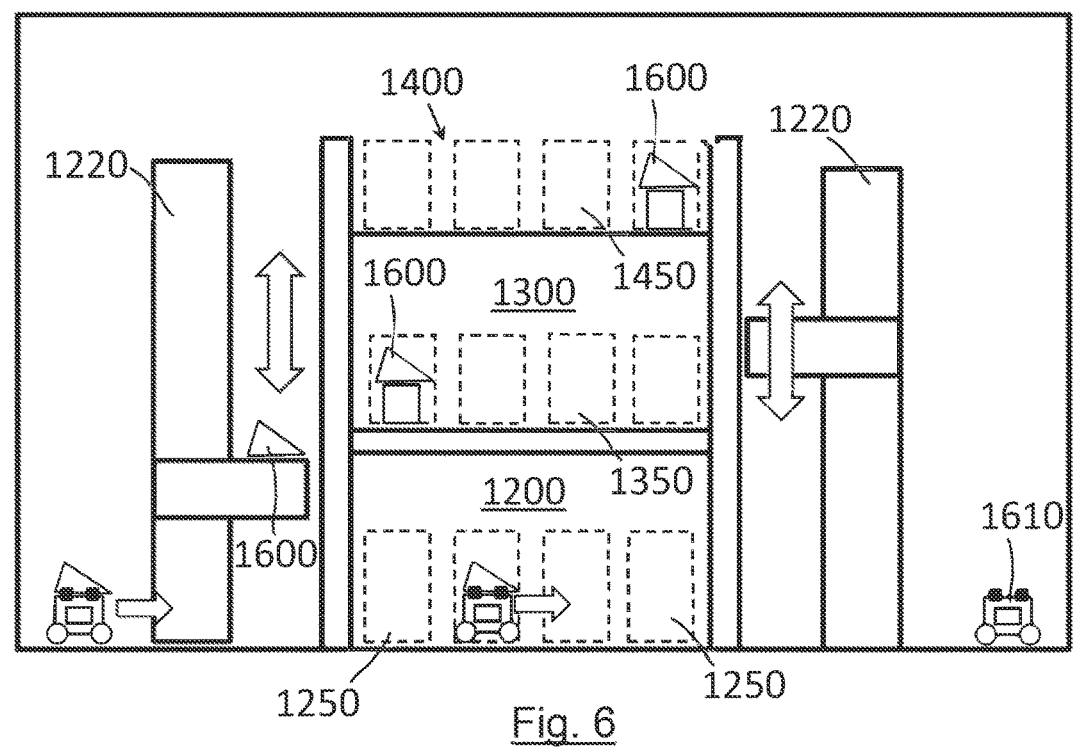
FIG. 6 is a sectional view of an aircraft sub-assembly production facility line in accordance with a third embodiment of the disclosure herein.

FIG. 6 shows schematically (as a sectional side view) an aircraft sub-assembly manufacturing facility 1000 according to a further embodiment which is similar to that shown in FIG. 4. The facility 1000 thus has a first floor 1200 on which there are various first floor workstations 1250, and a second floor 1300 with various second floor workstations 1350. The first floor workstations 1250 are for performing manufacturing steps on an aircraft wing sub-assembly 1600 that is carried by a mobile jig 1610. The sub-assembly 1600 once removed from the jig 1610 is transported to the second floor 1300 via an elevator 1220. In this embodiment there is additionally a third floor 1400 above the second floor on which there are further workstations 1450 for performing manufacturing steps on the sub-assembly 1600 (once removed from its jig 1610). The third floor 1400 is served by at least one of the two elevators 1220 shown.

The FIG. 6 embodiment is made by converting a pre-existing aircraft manufacturing facility. The existing facility is a building as shown in FIG. 6 with the first floor and various workstations and jigs for transporting the aircraft sub-assembly 1600. In order to convert the existing building, the second and third floors 1300 and 1400 respectively are provided and installed, as are the elevators 1220. Existing work stations may be reutilized, but it may also be necessary to provide and install some of each of the first floor, second floor and/or third floor workstations 1250, 1350 and 1450 respectively.

It will be observed that the illustrated embodiments provide an aircraft sub-assembly manufacturing method and associated facility where the sub-assembly moves between vertically separated levels (i.e. the floors) depending on its level of completeness.

While the disclosure herein has been described and illustrated with reference to particular embodiments, it will be appreciated by those of ordinary skill in the art that the disclosure herein lends itself to many different variations not specifically illustrated herein. By way of example only, certain possible variations will now be described.

For example, the number and arrangement of the workstations (of both floors) may differ from those described above. Furthermore, the number of floors, the arrangement of the elevators, and the movement of the sub-assembly around the facility may be different from the arrangements described above.

This provides more flexibility within the production line, allowing sub-assemblies to be removed and re-introduced at various stages of the manufacturing process. For example, should a sub-assembly fail a test at a testing workstation on the third floor, it may be moved to either the second or the first floor, depending on the nature of the failure and where in the production line it is required to be reintroduced. Furthermore, if a pulse-line arrangement is being used, it allows a greater number of discrete workstations, which may increase production efficiency.

Additionally, while the above arrangement describes the completed sub-assembly being returned to the first floor, it will be appreciated that a suitable door could be provided at the second floor (with a corresponding ramp or other arrangement outside the facility) such that the completed sub-assembly could be removed from the facility at the second (or third) floor, thereby removing the requirement for the second elevator. It may also be the case that the sub-assembly has other components added to it after it has moved from the second floor.

There may be variation of embodiments of the disclosure herein which do not utilize a jig and/or in which the jig is sufficiently light as to stay with the sub-assembly as it moves between floors. The sub-assembly may move between levels depending on its level of completeness. Thus, such embodiments could be considered as being examples of (a) a method of manufacturing an aircraft sub-assembly (e.g. a wing), the method comprising moving a partially completed sub-assembly to successive workstations within a first floor of a manufacturing facility and performing manufacturing steps at each of the first floor workstations, moving the aircraft sub-assembly to a second floor of the facility, the second floor being vertically separated from the first floor; moving the sub-assembly to successive workstations within the second and performing manufacturing steps at each of the second floor workstations and of (b) an aircraft manufacturing facility comprising a plurality of first floor workstations located at a first floor of the facility, and a plurality of second floor workstations located at a second floor of the facility, the second floor being vertically separated from the first floor, the first and second floor workstations all being arranged for receiving an aircraft sub-assembly and for performing manufacturing steps thereon; and an elevator apparatus, arranged for vertically transporting the aircraft sub-assembly between the first floor and the second floor. While employing multi-level manufacturing in the context of extremely large and massive parts such as an aircraft wing, or other similarly sized sub-assembly, might require extra equipment and/or processes in a conventional aircraft manufacturing facility, the space-saving and/or other efficiencies enjoyed may surprisingly be sufficiently beneficial to make this an advantageous change to make. It will be appreciated that other aspects of the above-described embodiments/disclosure herein may be incorporated into the subject matter described in this paragraph.

Where in the foregoing description, integers or elements are mentioned which have known, obvious or foreseeable equivalents, then such equivalents are herein incorporated as if individually set forth. Reference should be made to the claims for determining the true scope of the disclosure herein, which should be construed so as to encompass any such equivalents. It will also be appreciated by the reader that integers or features of the disclosure herein that are described as preferable, advantageous, convenient or the like are optional and do not limit the scope of the independent claims. Moreover, it is to be understood that such optional integers or features, while of possible benefit in some embodiments of the disclosure herein, may not be desirable, and may therefore be absent, in other embodiments. The term 'or' shall be interpreted as 'and/or' unless the context requires otherwise.

It should be understood that modifications, substitutions, and alternatives of the present invention(s) may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number. Furthermore, characteristics or steps which have been described may also be used in combination with other characteristics or steps and in any order unless the disclosure or context suggests otherwise.

This disclosure hereby incorporates by reference the complete disclosure of any patent or application from which it claims benefit or priority.

The invention claimed is:

1. A method for manufacturing an aircraft sub-assembly, the method comprising:
   mounting at least one component of the aircraft sub-assembly on a mobile jig that is movable within a first floor of a facility;
   moving the mobile jig between a plurality of first floor workstations on the first floor of the facility;
   performing manufacturing steps on the at least one component at the plurality of first floor workstations to assemble the aircraft sub-assembly;
   removing the aircraft sub-assembly from the mobile jig;
   moving the aircraft sub-assembly to a second floor of the facility, the second floor being vertically separated from the first floor;
   moving the aircraft sub-assembly between a plurality of second floor workstations on the second floor of the facility; and
   performing manufacturing steps on the aircraft sub-assembly at the plurality of second floor workstations.

2. The method of claim 1, further comprising,
   after performing manufacturing steps on the aircraft sub-assembly at the plurality of second floor workstations, returning the aircraft sub-assembly to the first floor of the facility.

3. The method of claim 1, wherein the second floor is above the first floor of the facility.

4. The method of claim 1, further comprising:
   moving the aircraft sub-assembly to a third floor of the facility, the third floor being vertically separated from the first floor and the second floor;
   moving the aircraft sub-assembly between a plurality of third floor workstations on the third floor of the facility; and
   performing manufacturing steps on the aircraft sub-assembly at the plurality of third floor workstations.

5. The method of claim 1, wherein:
   the at least one component comprises a plurality of components, each of which is mounted on the mobile jig; and
   the plurality of components are combined on the mobile jig to form the aircraft sub-assembly.

6. The method of claim 1, wherein the plurality of first floor workstations comprise a linear production line having a first workstation and a last workstation.

7. The method of claim 6, wherein the production line is one of a flow-line and a pulse-line production line.

8. The method of claim 1, wherein the aircraft sub-assembly is an aircraft wing.

9. A method of making an aircraft including assembling a sub-assembly of the aircraft to form at least part of the completely assembled aircraft, the sub-assembly being made using a method according to claim 1.

10. The method according to claim 6, wherein moving the mobile jig comprises moving the mobile jig along the linear production line from the first workstation to the last workstation.

11. The method according to claim 10, wherein the production line is one of a flow-line and a pulse-line production line.

12. The method according to claim 10, wherein moving the mobile jig further comprises, after removing the aircraft sub-assembly from the mobile jig at the last workstation, returning the mobile jig to the first workstation.

* * * * *